United States Patent
Lee et al.

(10) Patent No.: US 10,928,678 B2
(45) Date of Patent: Feb. 23, 2021

(54) LIQUID CRYSTAL DISPLAY DEVICE

(71) Applicant: Samsung Display Co., Ltd., Yongin-Si (KR)

(72) Inventors: Kwangkeun Lee, Osan-si (KR); Youngmin Kim, Asan-si (KR); Haeil Park, Seoul (KR); Moonjung Baek, Seoul (KR); Seon-tae Yoon, Seoul (KR); Kunhee Jo, Yongin-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/208,571

(22) Filed: Dec. 4, 2018

(65) Prior Publication Data

US 2019/0171067 A1 Jun. 6, 2019

(30) Foreign Application Priority Data

Dec. 4, 2017 (KR) .................. 10-2017-0165415

(51) Int. Cl.
*G02F 1/13357* (2006.01)
*G02F 1/1362* (2006.01)
(Continued)

(52) U.S. Cl.
CPC ...... *G02F 1/133617* (2013.01); *G02F 1/1368* (2013.01); *G02F 1/133514* (2013.01); *G02F 1/136277* (2013.01); *G02F 1/1362* (2013.01); *G02F 2001/136222* (2013.01); *G02F 2201/08* (2013.01); *G02F 2201/501* (2013.01);
(Continued)

(58) Field of Classification Search
CPC ........... G02F 1/133617; G02F 2201/08; G02F 2001/01791; G02F 2001/133614; G02F 2201/44; H01L 51/502; H01L 31/035218; H01L 51/5012; H05B 33/00
See application file for complete search history.

(56) References Cited

U.S. PATENT DOCUMENTS 7,750,984 B2   7/2010  Ha et al.
2013/0242228 A1*  9/2013  Park .................. G02F 1/133377
                                                                349/61
(Continued)

FOREIGN PATENT DOCUMENTS

JP    2017068248 A    4/2017
KR    10-2014-0074495 A    6/2014
KR    10-2016-0084557 A    7/2016

OTHER PUBLICATIONS

US 9,753,326 B2, 09/2017, Cho et al. (withdrawn)
(Continued)

*Primary Examiner* — Michael H Caley
*Assistant Examiner* — Mariam Qureshi
(74) *Attorney, Agent, or Firm* — Innovation Counsel LLP

(57) ABSTRACT

A liquid crystal display device includes a light source member and a display panel disposed on the light source member. The display panel includes a first substrate and a second substrate facing each other, a liquid crystal layer, and a color conversion layer that is disposed between the liquid crystal layer and the first substrate. The color conversion layer includes a light emitter and a low refractive body having a refractive index of about 1.0 to about 1.3. The liquid crystal display device exhibits high color reproducibility and improves external light extraction efficiency.

11 Claims, 9 Drawing Sheets

(51) Int. Cl.
*G02F 1/1335* (2006.01)
*G02F 1/1368* (2006.01)

(52) U.S. Cl.
CPC ...... *G02F 2202/36* (2013.01); *G02F 2202/42* (2013.01); *G02F 2203/055* (2013.01)

(56) References Cited

U.S. PATENT DOCUMENTS

| | | | |
|---|---|---|---|
| 2015/0301408 A1* | 10/2015 | Li | G02F 1/133621 362/84 |
| 2016/0041430 A1* | 2/2016 | Lee | G02F 1/133617 349/96 |
| 2016/0195773 A1 | 7/2016 | Lee et al. | |
| 2018/0284613 A1* | 10/2018 | Hirayama | G03F 7/16 |

OTHER PUBLICATIONS

Jeong Rok Oh et al., Optics Express vol. 19, No. 17 (2011), p. 16022-16031, Highly efficient full-color display based on blue LED backlight and electrochromic, 10 pages.

* cited by examiner

LIQUID CRYSTAL DISPLAY DEVICE

CROSS-REFERENCE TO RELATED APPLICATIONS

This U.S. non-provisional patent application claims priority under 35 U.S.C. § 119 of Korean Patent Application No. 10-2017-0165415, filed on Dec. 4, 2017, the description of which is hereby incorporated by reference in its entirety.

BACKGROUND

The present disclosure herein relates to a liquid crystal display device, and more particularly, to a liquid crystal display device including a low refractive body in a color conversion layer for reducing reflection caused by external light and improving light extraction efficiency.

Various types of display devices are used for providing image information. In particular, a liquid crystal display device is variously applied to a large display device, a potable display device, etc. due to its advantages of low power consumption. Meanwhile, in the case of the liquid crystal display device, the color conversion layer using a light emitter such as a quantum dot is being increasingly applied instead of a color filter layer to improve light efficiency and increase color reproducibility.

In addition, studies for improving a display quality of the liquid crystal display device is being continuously carried out by improving a structure of a display panel of the liquid crystal display device to further increase light extraction efficiency and reduce reflectance in the display panel caused by external light.

SUMMARY

The present disclosure provides a liquid crystal display device in which light extraction efficiency is improved.

The present disclosure also provides a liquid crystal display device having enhanced color reproducibility and reducing reflection caused by external light.

An embodiment of the inventive concept provides a liquid crystal display device including: a light source member and a display panel disposed on the light source member, wherein the display panel includes a first substrate; a second substrate facing the first substrate and disposed closer to the light source member than the first substrate; a liquid crystal layer disposed between the first substrate and the second substrate; and a color conversion layer disposed between the liquid crystal and the first substrate and including a light emitter and a low refractive body having a reflective index of about 1.0 to about 1.3.

In an embodiment, the color conversion layer may include a first color conversion portion including a first light emitter that is configured to absorb a first color light provided from the light source member and emit a second color light that is different from the first color light; a second color conversion portion including a second light emitter that is configured to absorb the first color light and emit a third color light that is different from the first color light and the second light color; and a third color conversion portion configured to transmit the first color light.

In an embodiment, the low refractive body may be included in the first color conversion portion and the second color conversion portion.

In an embodiment, the low refractive body may be further included in the third color conversion portion.

In an embodiment, the light emitter may include at least one of a fluorescent material and a quantum dot.

In an embodiment, the low refractive body may include at least one of hollow silica, aerogel, a porous inorganic particle including pores, and a porous organic particle including pores.

In an embodiment, the color conversion layer may further include a high refractive material having a refractive index of about 1.7 to about 3.5.

In an embodiment, the color conversion layer may further include at least one of $TiO_2$, $TaO_2$, $ZrO_2$, $Fe_2O_3$, $Al_2O_3$, $ZnO$, $In_2O_3$, $SnO_2$, or $Sb_2O_3$.

In an embodiment, the display panel may further include a light blocking layer disposed between the color conversion layer and the first substrate and blocking blue light.

In an embodiment, the light blocking layer may overlap the first color conversion portion and the second color conversion portion and may not overlap the third color conversion portion.

In an embodiment, the light blocking layer may be a yellow color filter layer.

In an embodiment, the first color conversion portion, the second color conversion portion, and the third color conversion portion may be spaced apart from one another on a plane, and the color conversion layer may further include a light blocking portion disposed between the first color conversion portion, the second color conversion portion, and the third conversion color portion that are spaced apart from one another.

In an embodiment, the light source member may emit blue light, the first color conversion portion may emit red light, and the second color conversion portion may emit green light.

An embodiment of the inventive concept provides a liquid crystal display device including: a light source member and a display panel disposed on the light source member, wherein the display panel may include a first substrate; a second substrate facing the first substrate and disposed closer to the light source member than the first substrate; a liquid crystal layer disposed between the first substrate and the second substrate; a polarizing layer disposed between the liquid crystal layer and the first substrate; and a color conversion layer disposed between the liquid crystal layer and the first substrate and including a low refractive body having a refractive index of about 1.0 to about 1.3.

In an embodiment, the color conversion layer may include: a first color conversion portion including a first light emitter and the low refractive body, the first light emitter being configured to absorb a first color light provided from the light source member and emit a second color light that is different from the first color light; a second color conversion portion including a second light emitter and the low refractive body, the second light emitter being configured to absorb the first color light and emit a third color light that is different from the first color light and the second color light; and a third color conversion portion configured to transmit the first color light.

In an embodiment, the third color conversion portion may further include the low refractive body.

In an embodiment, each of the first, second, and third color conversion portions may further include a high refractive material having a refractive index of 1.7 to 3.5.

In an embodiment, the polarizing layer may be disposed between the liquid crystal layer and the color conversion layer.

An embodiment of the inventive concept provides a liquid crystal display device, including: a light source member configured to emit blue light; and a display panel disposed on the light source member and including a red pixel area, a green pixel area, and a blue pixel area. The display panel may include a first substrate; a second display substrate facing the first substrate and disposed closer to the light source than the first substrate; a liquid crystal layer disposed between the first substrate and the second substrate; and a color conversion layer disposed between the liquid crystal layer and the first substrate, wherein the color conversion layer may include: a first color conversion portion disposed corresponding to the red pixel area and including a first light emitter that is configured to absorb the blue light and emit red light; a second color conversion portion disposed corresponding to the green pixel area and including a second light emitter that is configured to absorb the blue light and emit green light; and a third color conversion portion disposed corresponding to the blue pixel area and configured to transmit the blue light. The first color conversion portion and the second color conversion portion may include a low refractive body having a refractive index of 1.0 to 1.3.

In an embodiment, the third color conversion portion may further include the low refractive body, and each of the first color conversion portion and the second color conversion portion may further include a high refractive material having a refractive index of 1.7 to 3.5.

BRIEF DESCRIPTION OF THE FIGURES

The accompanying drawings are included to provide a further understanding of the inventive concept and are incorporated in and constitute a portion of this specification. The drawings illustrate exemplary embodiments of the inventive concept and, together with the description, serve to explain principles of the inventive concept. In the drawings.

DETAILED DESCRIPTION

Figure 1:
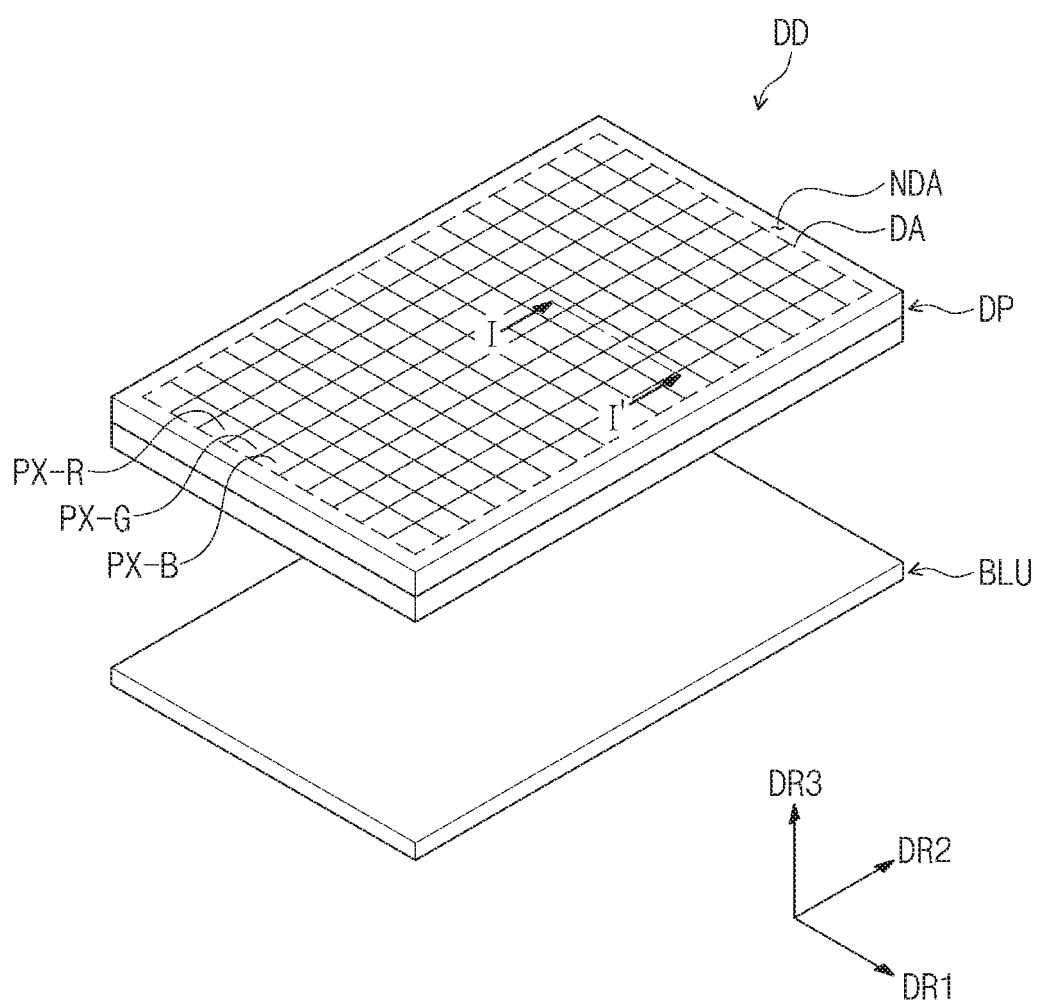
FIG. 1 is an exploded perspective view of a liquid crystal display device of one embodiment.

While the present disclosure is susceptible to various modifications and alternative forms, specific embodiments thereof are shown by way of example in the drawings and are herein described in detail. It should be understood, however, that the present disclosure is not intended to be limited to the particular forms disclosed, but on the contrary, is intended to cover all modifications, equivalents, and alternatives falling within the spirit and scope of the present disclosure.

Like reference numerals have been used for like elements in describing each drawing. In the accompanying drawings, the dimensions of structures may be exaggerated for clarity of illustration. Although the terms first, second, etc. may be used herein to describe various elements, these elements should not be limited by these terms. These terms are only used to distinguish one element from another element. For example, without departing from the teachings of the present disclosure, a first element could be termed a second element, and similarly, a second element could also be termed a first element. The singular forms are intended to include the plural forms as well, unless the context clearly indicates otherwise.

It will be understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In the present specification, when a portion of a layer, a film, a region, a plate, or the like is referred to as being "on" another portion, it includes not only the case where it is "directly on" another portion but also a case where one or more layers, films, regions, plates, etc. are present therebetween. On the contrary, when a portion such as a layer, a film, an area, a plate, or the like is referred to as being "under" another portion, it includes not only the case where the other portion is "directly under" but also a case where one or more layers, films, regions, plates, etc. are present therebetween. Further, in the present application, the term "disposed on" may include not only the upper portion but also the lower portion.

On the other hand, in the present application, "directly disposed" may mean that there is no layer, film, region, plate or the like added between the portion of the layer, the film, the region, the plate and the like and the other portion. For example, "directly disposed" may mean placing without an additional member such as an adhesive member between two layers or two members.

Hereinafter, a liquid crystal display device according to an embodiment of the inventive concept will be described with reference to the drawings.

Figure 2:
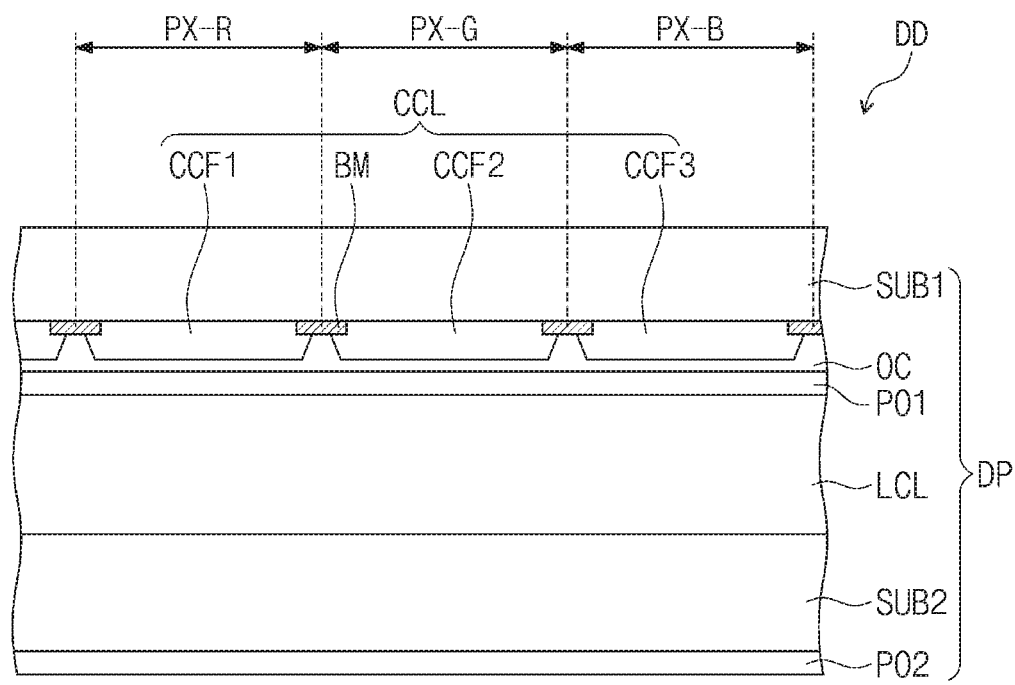
FIG. 2. is a cross-sectional view taken along line I-I' of the liquid crystal display device illustrated in FIG. 1.
Figure 3:
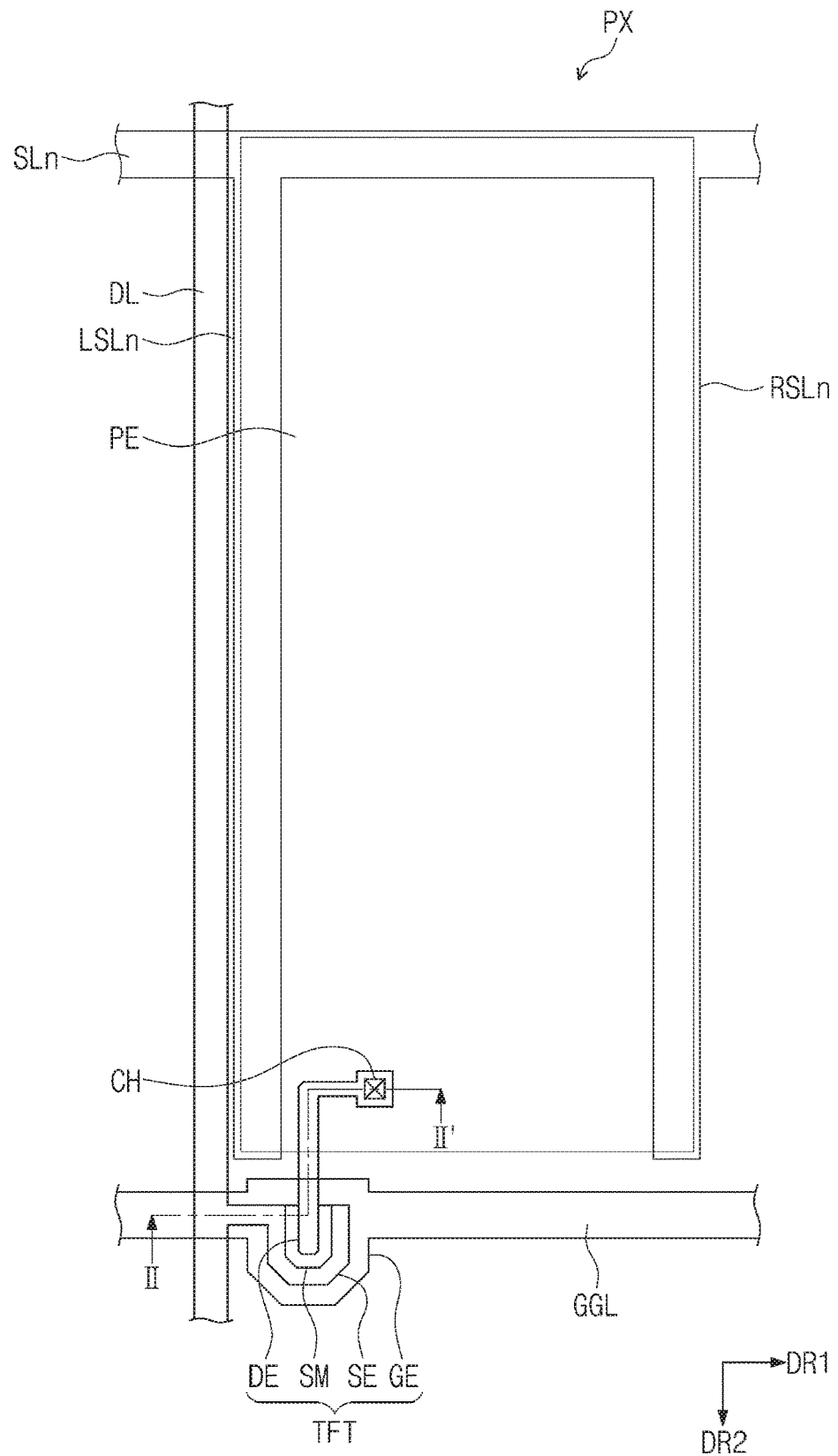
FIG. 3 is a plan view schematically illustrating one pixel of the pixels included in the liquid crystal display device of one embodiment.
Figure 4:
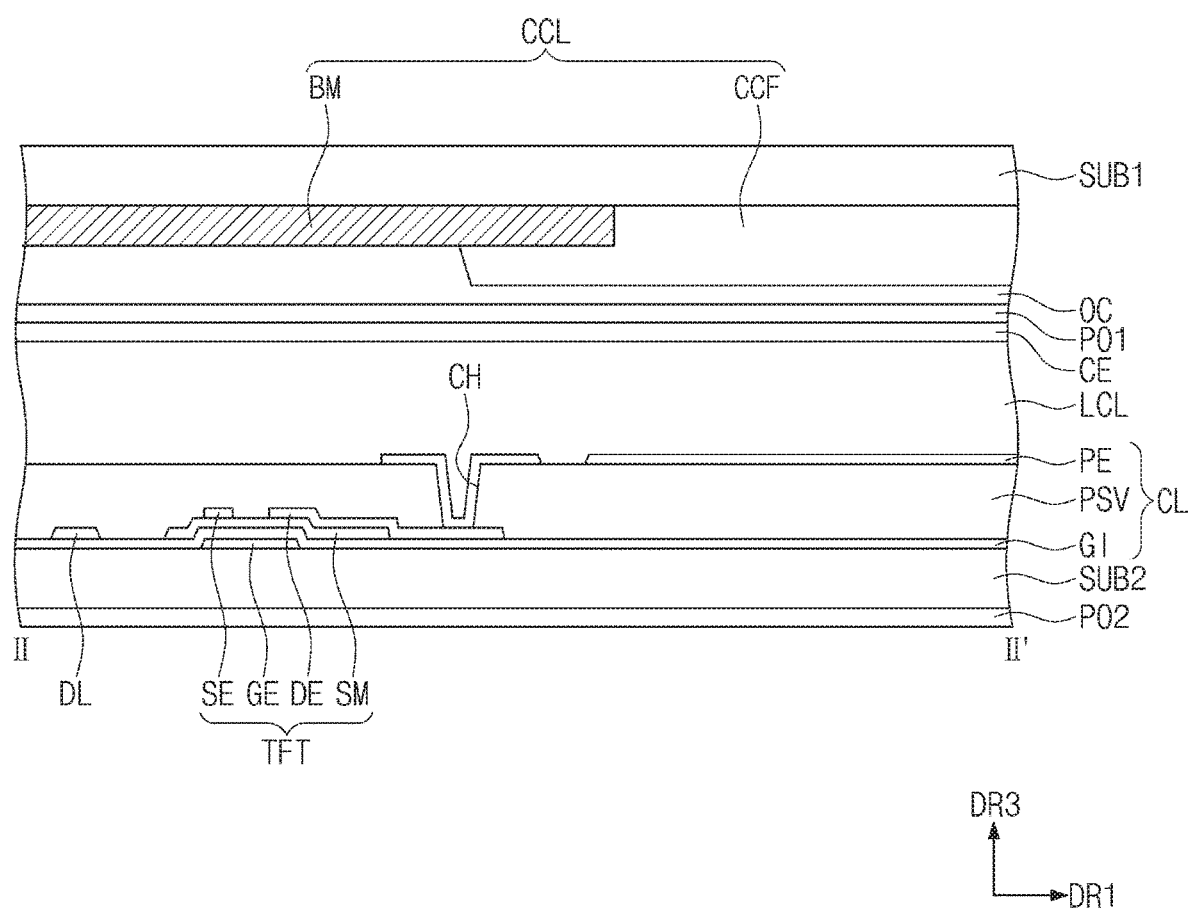
FIG. 4 is a cross-sectional view taken along line II-IF of FIG. 3.

FIG. 1 is an exploded perspective view of a liquid crystal display device of one embodiment. FIG. 2 is a cross-sectional view of a corresponding surface taken along line I-I' of the liquid crystal display device illustrated in FIG. 1. FIG. 3 is a plan view schematically illustrating one pixel of the pixels included in the liquid crystal display device of one embodiment, and FIG. 4 is a cross-sectional view taken along line II-IF of FIG. 3.

Referring to FIGS. 1 and 2, the liquid crystal display device DD may include a display panel DP and a light source member BLU configured to provide light to the display panel DP. The display panel DP may provide an image, and the light source member BLU may provide light to the display panel DP.

The light source member BLU may generate first color light and provide the first color light to the display panel DP. The light source member BLU may be a direct-type light source member disposed under the display panel DP and providing light to the display panel DP. The first color light provided from the light source member BLU may be blue light. For example, the light source member BLU may provide light in a wavelength region of about 350 nm to about 450 nm.

The light source member BLU may include a plurality of light emitting devices and a circuit board configured to provide power source to the light emitting devices. The light emitting devices in the light source member BLU may be disposed on the circuit board. For example, the light emitting devices in the light source member BLU may generate blue light.

Meanwhile, although not illustrated, the light source member BLU may further include at least one optical sheet for collecting and supplying light to the display panel DP. The optical sheet may be a light collimating sheet for collimating and supplying the light generated in the light emitting devices of the light source member BLU toward the display panel DP, that is, in a direction of a third directional axis DR3. For example, the optical sheet may be a light collecting sheet having a prism pattern.

The first color light generated by the light source member BLU may be provided to the display panel DP. The display panel DP may be disposed on the light source member BLU. The display panel DP may include a display area DA configured to display an image and a non-display area NDA configured not to display an image. The non-display area NDA may be disposed outside the display area DA.

The display panel DP may be a liquid crystal display panel including a liquid crystal layer LCL disposed between a first substrate SUB1 and a second substrate SUB2. In the liquid crystal display device DD, the display panel DP may include a color conversion layer CCL. The color conversion layer CCL may be disposed between the liquid crystal layer LCL and the first substrate SUB1. The color conversion layer CCL may include a light emitter disposed on the liquid crystal layer LCL, converting the first color light that is provided by the light source member BLU and transmitted through the liquid crystal layer LCL, and emitting light of a different color from the first color light.

The display panel DP may have a plate shape having a plane defined by a first directional axis DR1 and a second directional axis DR2. For example, the display area DA of the liquid crystal display device DD may have an approximately rectangular shape, but the embodiment is not limited thereto. The shape of the display area DA and the shape of the non-display area NDA may be relatively designed. The display panel DP may generate an image and provide the generated image toward a front surface. The display panel DP may provide the generated image to a side of the third directional axis DR3.

Meanwhile, in FIGS. 1 and 2, the liquid crystal display device DD is illustrated to have a flat shape, but the embodiment is not limited thereto. In one embodiment, the liquid crystal display device DD may be a curved display device. For example, the liquid crystal display device DD may be a curved display device that is bent concavely or convexly from a user's view. Further, the liquid crystal display device DD may be bent only in a portion of the liquid crystal display device DD.

According to one embodiment, the liquid crystal display device DD may be a flexible display device. For example, the liquid crystal display device DD may be a foldable display device or a rollable display device.

In the liquid crystal display device DD, the display area DA of the display panel DP may include a plurality of pixel areas PX-R, PX-G, and PX-B. For example, the pixel areas PX-R, PX-G, and PX-B may be defined by a plurality of gate lines GGL and a plurality of data lines DL. The pixel areas PX-R, PX-G, and PX-B may be disposed in a matrix form. A pixel PX may be disposed in each of the pixel areas PX-R, PX-G, and PX-B.

The display panel DP may include a first pixel area, a second pixel area, and a third pixel area that emit light having different wavelengths from one another. In the embodiment illustrated in FIGS. 1 and 2, the first pixel area may be a red pixel area PX-R, the second pixel area may be a green pixel area PX-G, and the third pixel area may be a blue pixel area PX-B. That is, the display panel DP may include a red pixel area PX-R, a green pixel area PX-G, and a blue pixel area PX-B. The red pixel area PX-R represents a red light emitting area emitting red light, and the green pixel area PX-G and the blue pixel area PX-B represent a green light emitting area and a blue light emitting area, respectively.

The display panel DP may include the first substrate SUB1 and the second substrate SUB2 facing each other, and the liquid crystal layer LCL that is interposed therebetween. The second substrate SUB2 may face the first substrate SUB1 and be disposed closer to the light source member BLU than the first substrate SUB1.

The first substrate SUB1 and the second substrate SUB2 may be each independently a polymer substrate, a plastic substrate, a glass substrate, a quartz substrate, or the like. The first substrate SUB1 and the second substrate SUB2 may be a transparent insulation substrate. In one embodiment, each of the first substrate SUB1 and the second substrate SUB2 may be rigid. In another embodiment, each of the first substrate SUB1 and the second substrate SUB2 may be flexible.

Meanwhile, referring to FIG. 4, a common electrode CE may be disposed on the first substrate SUB1, and a pixel electrode PE may be disposed on the second substrate SUB2. More specifically, the common electrode CE may be disposed on a lower surface of the first substrate SUB1, and the pixel electrode PE may be disposed on an upper surface of the second substrate SUB2. In one embodiment, the lower surface of the first substrate SUB1 may be adjacent to the liquid crystal layer LCL, and the upper surface of the second substrate SUB2 may be adjacent to the liquid crystal layer LCL.

A circuit layer CL including the pixel electrode PE may be disposed on the second substrate SUB2. The circuit layer CL may include a thin film transistor TFT, a pixel electrode PE, and the like.

The liquid crystal layer LCL may be disposed between the first substrate SUB1 and the second substrate SUB2 and may include a plurality of liquid crystal molecules. The liquid crystal molecules may have a dielectric anisotropy. The liquid crystal layer LCL is not particularly limited, and the liquid crystal molecules may be ones of commonly used liquid crystal molecules.

FIG. 3 illustrates one pixel, and the structure of each of the remaining pixels may be similar to the structure of the pixel illustrated in FIG. 3. In FIGS. 3 and 4, for convenience of description, one pixel PX connected to one gate line GGL and one data line DL is illustrated, but the embodiment is not limited thereto. For example, a plurality of pixels may be connected to one gate line and one data line, and a plurality of gate lines and a plurality of data lines may be connected to one pixel.

Referring to FIGS. 3 and 4, the gate line GGL are formed by extending in the direction of the first directional axis DR1. The gate line GGL may be formed on the second substrate SUB2. The data line DL may be provided by extending in the direction of the second directional axis DR2 crossing the gate line GGL that extend in the first directional axis DR1.

Each of the pixels PX includes a thin film transistor TFT, a pixel electrode PE connected to the thin film transistor TFT, and a storage electrode portion. The thin film transistor TFT includes a gate electrode GE, a gate insulation film GI, a semiconductor pattern SM, a source electrode SE, and a drain electrode DE. The storage electrode portion further includes a storage line SLn extending in the direction of the first directional axis DR1, and a first branch electrode LSLn and a second branch electrode RSLn that are branched from the storage line SLn and extending in the direction of the second directional axis DR2.

The gate electrode GE protrudes from the gate line GGL or is provided on a partial area of the gate line GGL. The gate electrode GE may be made of a metal, for example, nickel, chromium, molybdenum, aluminum, titanium, copper, tungsten, and an alloy including the same. The gate electrode GE may be formed of a single film or multiple films including one or more metals.

The semiconductor pattern SM is provided on the gate insulation film GI to overlap the gate electrode GE. In one embodiment, a partial area of the semiconductor pattern SM may overlap the gate electrode GE. The semiconductor pattern SM includes an active pattern (not illustrated) provided on the gate insulation film GI and an ohmic contact layer (not illustrated) formed on the active pattern. The active pattern may include an $n^+$ amorphous silicon thin film. The ohmic contact layer (not illustrated) makes an ohmic contact between the active pattern, and the source electrode SE and the drain electrode DE, respectively.

The source electrode SE is branched from the data line DL. The source electrode SE may be formed on the ohmic contact layer (not illustrated), and a partial area thereof may overlap the gate electrode GE. The data line DL may be disposed in an area in which the semiconductor pattern SM is not disposed in the gate insulation film GI.

The drain electrode DE is spaced apart from the source electrode SE with the semiconductor pattern SM being disposed therebetween. The drain electrode DE may be formed on the ohmic contact layer (not illustrated) and a partial area thereof may overlap the gate electrode GE.

The source electrode SE and the drain electrode DE may be made of nickel, chromium, molybdenum, aluminum, titanium, copper, tungsten, and an alloy including the same. The source electrode SE and the drain electrode DE may be formed of a single film or multiple films including a metal.

The pixel electrode PE is connected to the drain electrode DE with a protective film PSV disposed therebetween. The pixel electrode PE may partially overlap the storage line SLn, the first branch electrode LSLn, and the second branch electrode RSLn to form a storage capacitor.

The protective film PSV covers the source electrode SE, the drain electrode DE, a channel region of the thin film transistor TFT between the source electrode SD and the drain electrode DE, and the gate insulation film GI, and has a contact hole CH exposing a portion of the drain electrode DE. For example, the protective film PSV may include silicon nitride or silicon oxide.

The pixel electrode PE is connected to the drain electrode DE through the contact hole CH formed through the protective film PSV. The pixel electrode PE may be formed of a transparent conductive material. Particularly, the pixel electrode PE is formed of a transparent conductive oxide. The transparent conductive oxide may be indium tin oxide (ITO), indium zinc oxide (IZO), indium tin zinc oxide (ITZO), or the like.

The common electrode CE provided on the first substrate SUB1 forms an electric field together with the pixel electrode PE, thereby controlling the liquid crystal layer LCL. In the embodiment illustrated in FIG. 4, the common electrode CE is disposed on the first substrate SUB1, but the embodiment is not limited thereto, and the common electrode CE may be disposed on the second substrate SUB2. The common electrode CE may be formed of a transparent conductive material. For example, the common electrode CE may be formed of a conductive metal oxide such as indium tin oxide (ITO), indium zinc oxide (IZO), and indium tin zinc oxide (ITZO). Meanwhile, although not illustrated in the drawings, an alignment-inducing layer (not illustrated) configured to orient each liquid crystal molecule may be disposed on each of the common electrode CE and the pixel electrode PE. In one embodiment, the alignment-inducing layer (not illustrated) may be disposed on a lower surface of the common electrode CE and on an upper portion of the pixel electrode PE adjacent to the liquid crystal layer LCL.

Referring back to FIG. 2, the display panel DP may include a first polarizing layer P01 and a second polarizing layer P02 facing each other. The first polarizing layer P01 may be disposed between the first substrate SUB1 and the liquid crystal layer LCL, in particular, between the color conversion layer CCL and the liquid crystal layer LCL. The first polarizing layer P01 may be an incell type polarizing layer disposed adjacent to the liquid crystal layer LCL.

In one embodiment, the first polarizing layer P01 may be a reflective polarizer that transmits the light vibrating in one direction and reflects the light vibrating in another direction substantially perpendicular to one direction. In another embodiment, the first polarizing layer P01 may be an absorptive polarizer that transmits the light vibrating in one direction and absorbs the light vibrating in another direction orthogonal to one direction.

The first polarizing layer P01 may be a coating-type polarizing layer or a polarizing layer formed by vapor deposition. The first polarizing layer P01 may be formed by coating a material including a dichroic dye and a liquid crystal compound. Alternatively, the first polarizing layer P01 may be a wire grid polarizer. In this case, the first polarizing layer P01 may be an in-cell type polarizer.

The second polarizing layer P02 may be disposed to face the first polarizing layer P01 with the liquid crystal layer LCL disposed therebetween. The second polarizing layer P02 may be disposed on an upper surface or a lower surface of the second substrate SUB2. For example, in one embodiment illustrated in FIG. 2, the second polarizing layer P02 is disposed between the second substrate SUB2 and the light source member BLU, but the embodiment is not limited thereto. For example, the second polarizing layer P02 may be disposed between the second substrate SUB2 and the liquid crystal layer LCL. In this case, the second polarizing layer P02 may be an in-cell type polarizer.

The second polarizing layer P02 may be an absorptive polarizer or a reflective polarizer. The second polarizing layer P02 may be a coating-type polarizing layer or a polarizing layer formed by vapor deposition. Further, the second polarizing layer P02 may be a polarizing member provided in a film type.

Referring to FIG. 2, the color conversion layer CCL may include a plurality of color conversion portions CCF1, CCF2, and CCF3. A first to third color conversion portions CCF1, CCF2, and CCF3 may be spaced apart from one another on a plane. Meanwhile, the first color conversion portion CCF1 may be disposed corresponding to the red pixel area PX-R of the display panel DP, and the second and third color conversion portions CCF2 and CCF3 may be disposed corresponding to the green pixel area PX-G and the blue pixel area PX-B, respectively.

The color conversion layer CCL may further include a light blocking portion BM. The light blocking portion BM is provided corresponding to a blocking area of the first substrate SUB1. The blocking area may be defined as an area in which the data line DL, the thin film transistor TFT, and the gate line GGL are formed. The light blocking portion BM is formed in the blocking area to block light leakage. In an embodiment of the inventive concept, the light blocking portion BM is disclosed to be included in the color conversion layer CCL disposed on the first substrate SUB1, but the embodiment is not limited thereto, and the light blocking portion BM may be disposed even on the second substrate SUB2.

In addition, referring to FIG. 2, the display panel DP may further include a planarization layer OC. The planarization layer OC may be disposed between the color conversion layer CCL and the first polarizing layer P01 to fill uneven portions of the color conversion layer CCL. In some embodiments, the planarization layer OC may be omitted.

Figure 5:
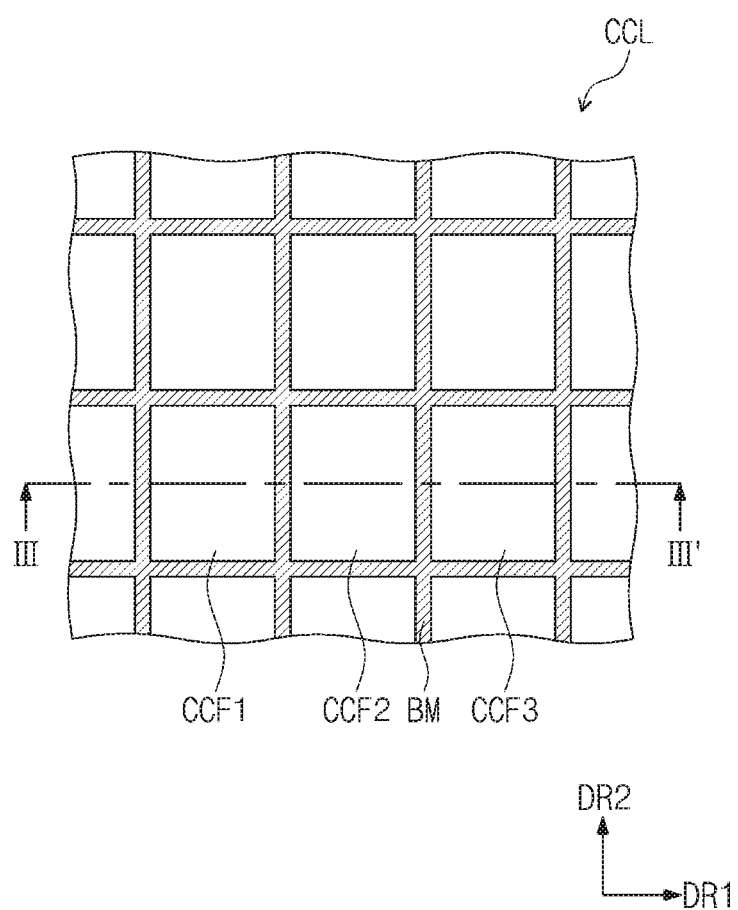
FIG. 5 is a plan view of a color conversion layer included in the liquid crystal display device of one embodiment.
Figure 6:
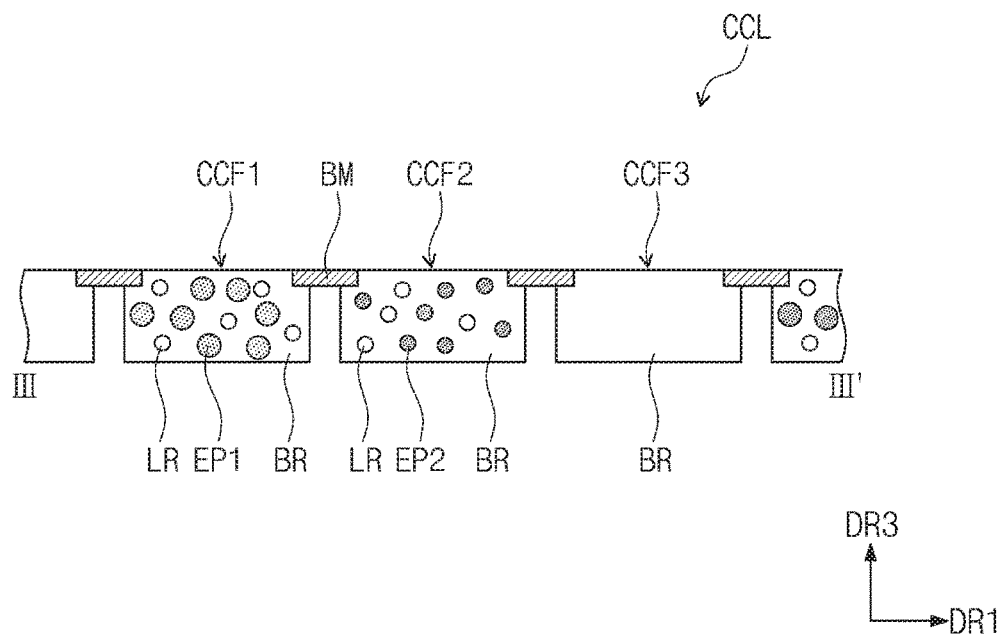
FIGS. 6 and 7 are cross-sectional views taken along line III-III' of FIG. 5.

FIG. 5 is a plan view of a color conversion layer CCL included in the liquid crystal display device DD of one embodiment. FIG. 6 is a cross-sectional view illustrating one embodiment of a color conversion layer CCL taken along line III-III' in FIG. 5.

Referring to FIGS. 5 and 6, the first to third color conversion portions CCF1, CCF2, and CCF3 may be arranged to be spaced apart from one another on a plane defined by the first directional axis DR1 and the second directional axis DR2. In one embodiment, the first to third color conversion portions CCF1, CCF2, and CCF3 emitting light of different colors from one another may be spaced apart from one another in the direction of the first directional axis DR1 and disposed side by side, and the color conversion portions emitting the same color may be spaced apart from one another and disposed side by side in the direction of the second directional axis DR2. However, the embodiment is not limited thereto, and the arrangement of the plurality of color conversion portions CCF1, CCF2, and CCF3 may be variously changed.

The light blocking portion BM may be disposed between the color conversion portions CCF1, CCF2, and CCF3 that are disposed to be spaced apart from one another. The light blocking portion BM may be a black matrix. The light blocking portion BM may be formed by including an organic light blocking material or an inorganic light blocking material including a black pigment or a dye. The light blocking portion BM may prevent a light leakage phenomenon and divide a boundary between the neighboring color conversion portions CCF1, CCF2, and CCF3.

Meanwhile, at least a portion of the light blocking portion BM may be disposed to partially overlap the neighboring color conversion portions CCF1, CCF2, and CCF3. The light blocking portion BM may be disposed to overlap the color conversion portion CCF1, CCF2, and CCF3 neighboring in a thickness direction on a plane defined by the first directional axis DR1 and the second directional axis DR2.

According to one embodiment, the color conversion layer CCL may include light emitters EP1 and EP2, and a lower refractive body LR. Referring to FIG. 6, the color conversion layer CCL may include a first color conversion portion CCF1 including a first light emitter EP1 that absorbs a first color light and emits a second color light that is different from the first color light, a second color conversion portion CCF2 including a second light emitter EP2 that absorbs a first color light and emits a third color light that is different from the first color light and the second color light, and a third color conversion portion CCF3 configured to transmit the first light color. For example, the first color light may be blue light, the second color light may be red light, and the third color light may be green light.

For example, the first light emitter EP1 may absorb the first color light that is blue light and emit red light, and the second light emitter EP2 may absorb the first color light that is blue light and emit green light. That is, the first color conversion portion CCF1 may be a red light emitting area that emits red light, and the second color conversion portion CCF2 may be a green light emitting area that emits green light. Further, the third color conversion portion CCF3 may transmit the first color light provided from the light source member BLU shown in FIG. 2. That is, the third color conversion portion CCF3 may be a blue light emitting area that emits blue light.

The first color conversion portion CCF1, the second color conversion portion CCF2, and the third color conversion portion CCF3 of the color conversion layer CCL correspond to the red pixel area PX-R, the green pixel area PX-G, and the blue pixel area PX-B of the display panel DP, respectively.

In addition, the first and second color conversion portions CCF1 and CCF2 may include a low refractive body LR. That is, the first color conversion portion CCF1 may include the first light emitter EP1 and a low refractive body LR, the second color conversion portion CCF2 may include the second light emitter EP2 and a low refractive body LR, and the third color conversion portion CCF3 may include neither a light emitter nor a low refractive body.

Meanwhile, the first to third color conversion portions CCF1, CCF2, and CCF3 may include a base resin BR. The base resin BR may be a polymer resin. For example, the base resin BR may be an acryl-based resin, a urethane-based resin, a silicon-based resin, an epoxy-based resin, and the like. The base resin BR may be a transparent resin. The light emitters EP1 and EP2 and the low refractive body LR may be dispersed in the base resin BR of the respective color conversion portions CCF1 and CCF2.

The light emitters EP1 and EP2 included in the color conversion layer CCL may be a fluorescent material or quantum dots. That is, the color conversion layer CCL may include at least one of the fluorescent material or the quantum dots.

In one embodiment, the fluorescent material used as light emitters EP1 and EP2 may be an inorganic fluorescent material. For example, the fluorescent material used as light emitters EP1 and EP2 in the liquid crystal display device DD may be a red fluorescent material or a green fluorescent material.

The red fluorescent material may be at least one selected from the group consisting of $(Sr,Ca,Ba,Mg)P_2O_7:Eu^{2+}$, $Mn^{2+}$, $CaLa_2S_4:Ce^{3+}$; $SrY_2S_4:Eu^{2+}$, $(Ca,Sr)S:Eu^{2+}$, $SrS:Eu$ $Eu^{2+}$, $Y_2O_3:Eu^{3+},Bi^{3+}$; $YVO4:Eu^{3+},Bi^{3+}$; $Y_2O_2S:Eu^{3+},Bi^{3+}$; $Y_2O_2S:Eu^{3+}$, and the like. The green fluorescent material may be at least one selected from the group consisting of $YBO_3:Ce^{3+},Tb^{3+}$, $BaMgAl_{10}O_{17}:Eu^{2+}$, $Mn^{2+}$, $(Sr,Ca,Ba)(Al,Ga)_2S_4:Eu^{2+}$; $ZnS:Cu,Al$, $Ca_8Mg(SiO_4)_4Cl_2:Eu^{2+}$, $Mn^{2+}$; $Ba_2SiO_4:Eu^{2+}$; $(Ba,Sr)_2SiO_4:Eu^{2+}$; $Ba_2(Mg,Zn)Si_2O_7:Eu^{2+}$; $(Ba,Sr)Al_2O_4:Eu^{2+}$, $Sr_2Si_3O_8.2SrCl_2:Eu^{2+}$, and the like. On the other hand, the fluorescent material used in the color conversion layer CCL of the liquid crystal display device DD is not limited to the above-described fluorescent materials, and a known fluorescent material other than the above-described fluorescent material may be used.

In another embodiment, the light emitters EP1 and EP2 included in the color conversion layer CCL may be quantum dots. A quantum dot may be selected from Group II-VI compounds, Group III-V compounds, Group IV-VI compounds, Group IV elements, Group IV compounds, and combinations thereof.

The Group II-VI compound may be selected from the group consisting of a two-element compound selected from the group consisting of CdSe, CdTe, ZnS, ZnSe, ZnTe, ZnO, HgS, HgSe, HgTe, MgSe, MgS and any mixtures thereof; a three-element compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and any mixtures thereof; and a four-element compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and any mixtures thereof.

The Group III-V compound may be selected from the group consisting of a two-element compound selected from the group consisting of GaN, GaP, GaAs, GaSb, AN, AlP, AlAs, AlSb, InN, InP, InAs, InSb, and any mixtures thereof; a three-element compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and any mixtures thereof; and a four-element compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and any mixtures thereof. The Group IV-VI may be selected from the group consisting of a two-element selected from the group consisting of SnS, SnSe, SnTe, PbS, PbSe, PbTe, and any mixtures thereof; a three-element compound selected from the group consisting of SnSeS, SnSeTe, SnSTe, PbSeS, PbSeTe, PbSTe, SnPbS, SnPbSe, SnPbTe, and any mixtures thereof; and a four-element compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and any mixtures thereof. The Group IV element may be selected from Si, Ge, and any mixtures thereof. The Group IV compound may be a two-element compound selected from the group consisting of SiC, SiGe, and any mixtures thereof.

In this case, the two-element compound, the three-element compound, or the four-element compound may be present in a particle at a uniform concentration or may be present in the same particle by dividing concentration distribution into a partially different state.

The quantum dot may be a core-shell structure including a core and a shell surrounding the core. Further, the quantum dot may have a core-shell structure surrounding other quantum dots. The interface between the core and the shell may have a concentration gradient in which the concentration of an element present in the shell becomes lower or higher toward the center.

The quantum dot may be a particle having a nanometer scale size. The quantum dot may have a full width of half maximum (FWHM) of the light emitting wavelength spectrum of about 45 nm or less, preferably about 40 nm or less, or more preferably about 30 nm or less. In this range of the light emitting wavelength spectrum, color purity and color reproducibility may be improved. Further, the light emitted through such a quantum dot emits in all directions, so that a viewing angle may be improved to provide a wide viewing angle.

The shape of the quantum dot may not be particularly limited. For example, the quantum dot may have a commonly used shape in the art, more specifically, in the form of spherical, pyramidal, multi-arm, or cubic nanoparticles, nanotubes, nanowires, nanofibers, nanoplate-like particles, and the like.

The quantum dot may change the color of light emitted depending on a particle size. When the first light emitter EP1 and the second light emitter EP2 are quantum dots, the particle sizes of the first light emitter EP1 and the second light emitter EP2 may be different from each other. For example, the particle size of the first light emitter EP1 may be larger than that of the second light emitter EP2. In this case, the first light emitter EP1 may emit light having a longer wavelength than a wavelength of light emitted by the second light emitter EP2.

Figure 7:
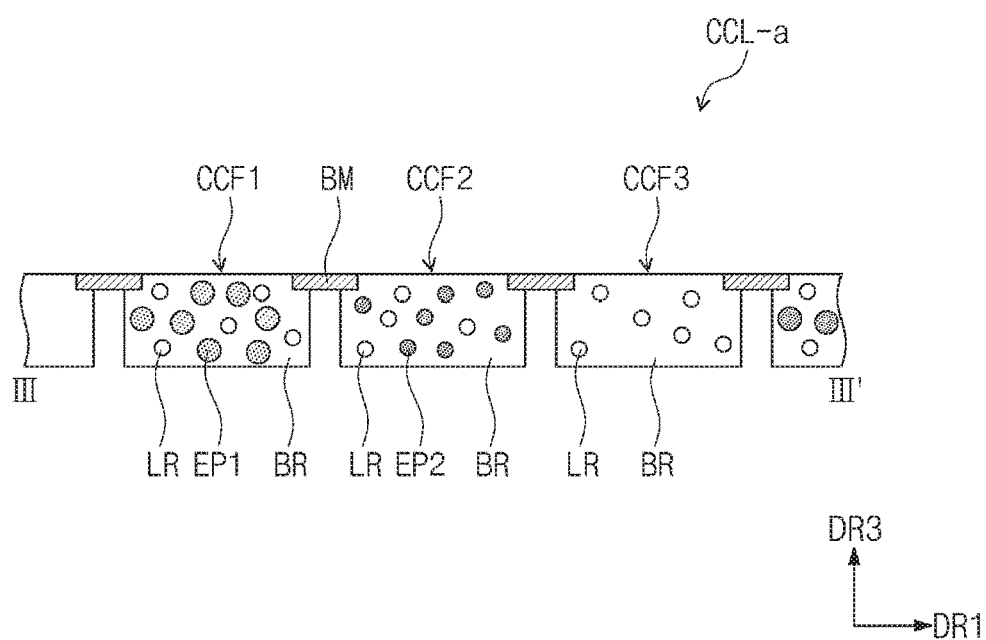

FIG. 7 is a cross-sectional view illustrating another embodiment of a color conversion layer. The color conversion layer CCL-a illustrated in FIG. 7 may include the first to third color conversion portions CCF1, CCF2, and CCF3, and may further include the low refractive body LR in the third color conversion portion CCF3 as compared with the color conversion layer CCL of the embodiment illustrated in FIG. 6.

The low refractive body LR included in the color conversion layers CCL and CCL-a may have a refractive index of about 1.0 to about 1.3. For example, the low refractive body may be a hallow silica, an aerogel, or a porous particle including pores. Specifically, the porous particle may be an inorganic particle or an organic particle including many atypical pores.

When the refractive index of the low refractive body LR is more than 1.3, the difference of the refractive indices between the base resin BR in which the low refractive body LR is dispersed and the low refractive body LR is not large, so that a light path change of the light incident to the low refractive body LR may be insufficient. Further, the low refractive body LR is formed of an inorganic or organic particle, and thus may have a refractive index of at least 1.0 or more.

Figure 8A:
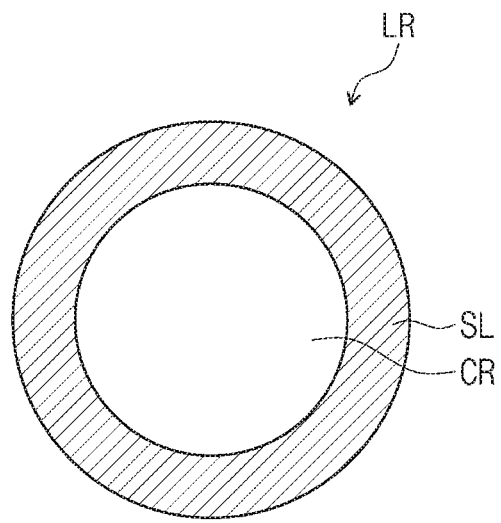
FIGS. 8A and 8B are cross-sectional views illustrating one embodiment of a low refractive body included in the color conversion layer.
Figure 8B:
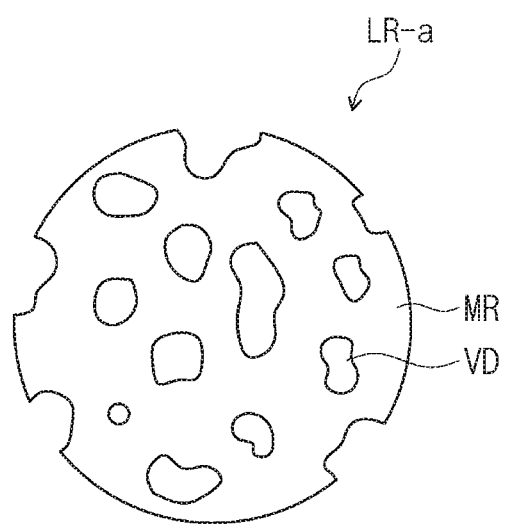

FIGS. 8A and 8B are cross-sectional views illustrating one embodiment of a low refractive body. FIG. 8A may illustrate a cross section of a low refractive body LR having a spherical shape. The low refractive body LR may be a particle having a core-shell structure in which a core portion CR is filled with air, and a sell portion SL surrounds the core portion CR. For example, the shell portion SL may be formed of a silica material, and the core portion CR is filled with air, or may be filled with liquid or gas having a low refractive property.

FIG. 8B exemplarily illustrates a cross section of a low refractive body LR-a that is a porous particle. The porous low refractive body LR-a may include one or more voids VD and a matrix MR defining the void VD(s). In one embodiment, the low refractive body LR-a may include a matrix MR all connected together like a foam resin, and a plurality of voids VD formed in the matrix MR. The inside of the void VD may be filled with air, or liquid or gas having a low refractive property. A plurality of voids may be connected to one another. As a material of the matrix MR, polysiloxane and the like may be used, but the embodiment is not limited thereto, and other organic materials may be used as a matrix MR material. The shape of the void VD is not particularly limited and may be formed in an amorphous form.

FIGS. 8A and 8B illustrates the examples in which the cross sections of the low refractive bodies LR and LR-a are substantially spherical, but the embodiment of the low refractive bodies LR and LR-a is not limited thereto, and the cross section of the low refractive bodies LR and LR-a may be elliptical or amorphous.

The core portion CR or a void VD of the low refractive bodies LR and LR-a may include a low refractive material such as air to realize a low refractive index, and the light provided to the low refractive bodies LR and LR-a passes through the core portion CR or the void VD having a refractive index of 1.3 or less, and the proceeding direction of light may be changed.

In one embodiment of the color conversion layers CCL and CCL-a illustrated in FIGS. 6 and 7, the low refractive body LR may be included in an amount of about 5 to about 15 parts by weight, based on 100 parts by weight of the base rein BR. On the other hand, the low refractive body LR may be included in different amounts in different color conversion portions CCF1, CCF2, and CCF3. For example, the third color conversion portion CCF3 may include a low refractive body LR having a smaller amount than the first color conversion portion CCF1 and the second color conversion portion CCF2.

The liquid crystal display device of the above-described embodiment includes a color conversion layer including a light emitter such as a fluorescent material or a quantum dot, and a low refractive body in the color conversion layer, so that the color reproducibility of the display panel may be improved, and the extraction efficiency of light emitted to the outside of the display panel may be improved. For example, the low refractive body of the color conversion layer may change the proceeding direction of the light to be provided to the color conversion layer and the light to be emitted by the light emitter. Accordingly, the amount of light totally reflected at the boundary between the display panel and the outside may be reduced. Therefore, in the liquid crystal display device, the light path is changed by the low refractive body included in the color conversion layer and is emitted in the color conversion layer, and the amount of light incident with a critical angle causing total reflection at the interface between the display panel and the outside with respect to the total light incident to the first substrate of the display panel is reduced, thereby being capable of improving the light extraction efficiency.

Figure 9:
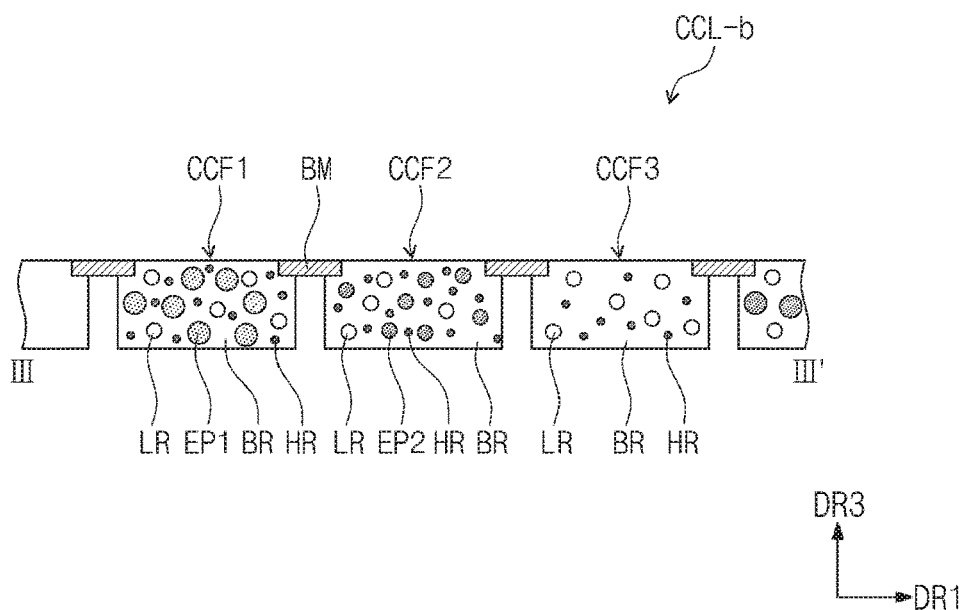
FIG. 9 is a cross-sectional view illustrating one embodiment of a color conversion layer further including a high refractive material.

Meanwhile, the color conversion layer CCL included in the liquid crystal display device DD (see FIG. 2) may further include a high refractive material. FIG. 9 is a cross-sectional view illustrating one embodiment of a color conversion layer further including a high refractive material.

Referring to FIG. 9, a color conversion layer CCL-b may include a high refractive material HR dispersed in the base resin BR. In FIG. 9, the first to third color conversion portions CCF1, CCF2, and CCF3 may include a low refractive body LR and a high refractive material HR. The high refractive material HR may be a scattering particle scattering the light emitted by the light emitters EP1 and EP2, or the light that transmits the liquid crystal layer LCL (see FIG. 2) and is incident to the color conversion portions CCF1, CCF2, and CCF3. The high refractive material HR may have a refractive index of about 1.7 to about 3.5. The high refractive material HR may be a metal oxide particle. For example, the high refractive material HR may include at least one of $TiO_2$, $TaO_2$, $ZrO_2$, $Fe_2O_3$, $Al_2O_3$, $ZnO$, $In_2O_3$, $SnO_2$, or $Sb_2O_3$.

The color conversion layer CCL-b further including a high refractive material HR increases a degree of light scattering in the color conversion layer CCL-b, whereby the light extraction efficiency of the color conversion layer CCL-b may be improved. Further, in the color conversion layer CCL-b including both the low refractive body LR and the high refractive material HR, the low refractive body LR decreases a degree of light scattering in the high refractive material HR caused by an external light, whereby the external light reflection caused by the external light may be decreased, and the light extraction efficiency may be also increased from the display panel to the outside according to the light path change by the low refractive body LR.

Table 1 shows comparison of the light extraction efficiency and the refractive index between the liquid crystal display device of one example (Example 1) and the liquid crystal display device of a comparative example (Comparative Example 1).

TABLE 1

|  | Comparative Example 1 | Example 1 |
| --- | --- | --- |
| Light extraction efficiency (%) | 100 | 110 |
| External light reflectance (%) | 100 | 80 |

Table 1 shows results for the liquid crystal device of Comparative Example 1 having a color conversion layer that includes only a high refractive material, and the liquid crystal device of Example 1 having a color conversion layer that includes a high refractive material and a low refractive body of the same amount. The results in Table 1 show that the light extraction efficiency and the external light reflectance in Example 1 is relatively evaluated, based on the light extraction efficiency and the external light reflectance of Comparative Example 1. Example 1 including a low refractive body in the color conversion layer shows higher light extraction efficiency and more reduced external light reflectance than Comparative Example 1. From the results of Table 1, it may be ascertained that the light extraction efficiency from the display panel to the outside is increased due to a change in the light path of the scattered light by the low refractive body, and the reflectance in the color conversion layer due to the external light is decreased.

That is, the liquid crystal display device may include a color conversion layer including a light emitter, a low refractive body, and a high refractive material to increase the color reproducibility and may increase the light extraction efficiency to the outside of the display panel and reduce the external light reflectance by the external light, thereby improving the display quality.

Figure 10:
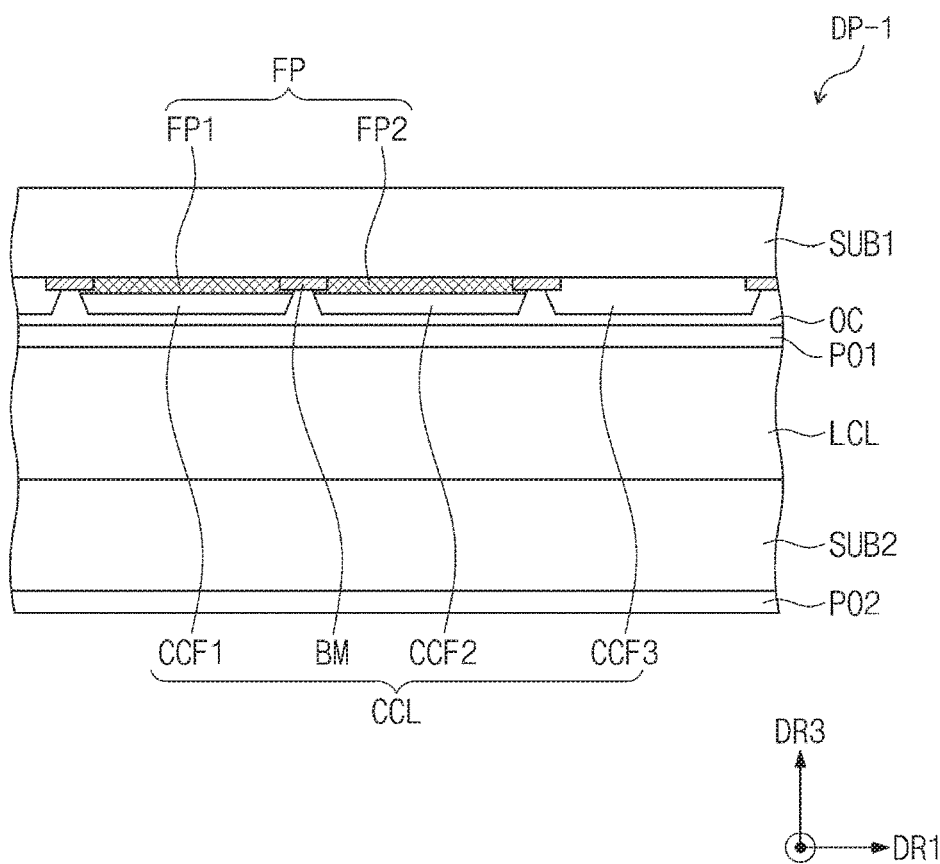
FIG. 10 is a cross-sectional view of the liquid crystal display device of one embodiment.

FIG. 10 is a cross-sectional view illustrating one embodiment of a display panel included in the liquid crystal display device DD (see FIG. 1) of one embodiment. In the description for a display panel DP-1 illustrated in FIG. 10, the detailed description of the elements described in FIGS. 1 to 9 will be omitted for the sake of brevity, and the differences thereof will be mainly described.

The display panel DP-1 includes a first substrate SUB1 and a second substrate SUB2 facing each other, and a liquid crystal layer LCL disposed between the first substrate SUB1 and the second substrate SUB2. The color conversion layer CCL including a first color conversion portion CCF1 and a second color conversion portion CCF2 is disposed between the liquid crystal layer LCL and the first substrate SUB1, and the color conversion layer CCL in FIG. 10 may be applied to any one of the color conversion layers in FIGS. 6, 7 and 9 described above.

The display panel DP-1 may further include a light blocking layer FP overlapping the first color conversion portion CCF1 and the second color conversion portion CCF2. The light blocking layer FP may overlap the first and second color conversion portions CCF1 and CCF2 but may not overlap the third color conversion layer CCF3.

The light blocking layer FP may block the first color light and transmit the second color light and the third color light. That is, the light blocking layer FP may block blue light and transmit green light and red light in the first color conversion portion CCF1 and the second color conversion portion CCF2, respectively. The light blocking layer FP may include a first blocking layer FP1 disposed on the first color conversion portion CCF1 and a second blocking layer disposed on the second color FP2 conversion portion CCF2. The first blocking layer FP1 and the second blocking layer FP2 may be the same or have different configurations from each other. For example, the first blocking layer FP1 may be a filter layer that blocks blue light and transmits red light, and the second blocking layer FP2 may be another filter layer that blocks blue light and transmits green light.

The light blocking layer FP may include a single layer or may be in the form in which multiple layers are stacked. For example, the light blocking layer FP may be a single layer including a material absorbing blue light, or a structure in which multiple organic layers are stacked.

In addition, the light blocking layer FP may include a pigment or a dye to block light having a specific wavelength. For example, the light blocking layer FP may be a yellow color filter layer that absorbs blue light to block blue light.

The liquid crystal display device including the display panel DP-1 may block the blue light that is incident from the outside and the blue light transmitting the color conversion portion CCL and emitted to the outside using the light blocking layer FP. Accordingly, the color reproduction rate may be improved.

Figure 11:
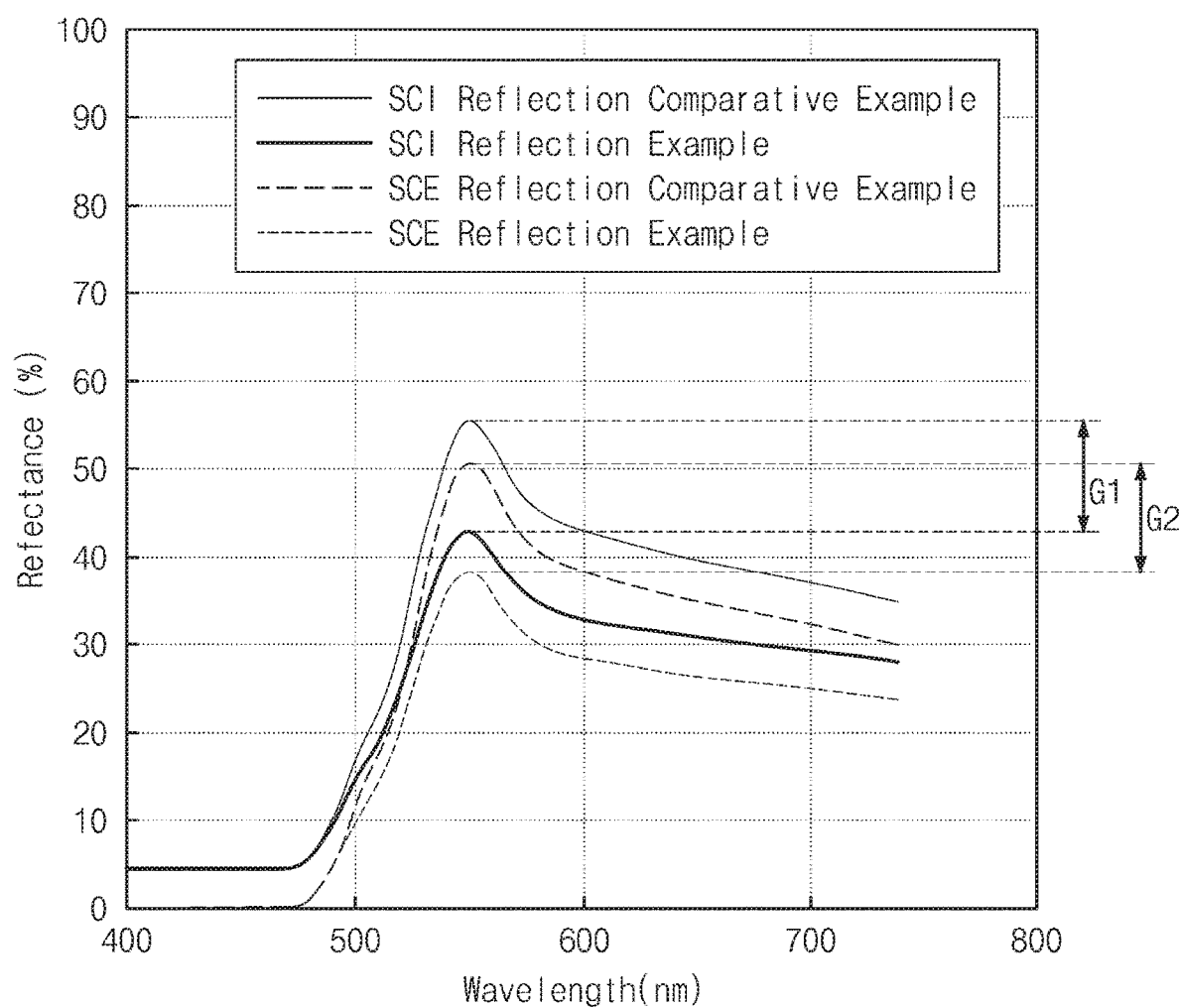
FIG. 11 is a graph comparing the refractive index of the external light in Example and Comparative Example.

FIG. 11 shows the external light reflectance for the liquid crystal display device of one embodiment in comparison with the liquid crystal display device of Comparative Example. In FIG. 11, SCI reflection measures reflectance by including both the specular reflection and the scattered reflection, and SCE reflection measures reflectance except the specular reflection. FIG. 11 shows the comparison of the reflectance in a green light emitting area.

The results of Comparative Examples illustrated in FIG. 11 are the case of including a light emitter and a high refractive material in the color conversion portion, and Examples are the case of including a light emitter, a high refractive material, and a low refractive body. From the comparison results of FIG. 11, it may be ascertained that the reflectance in Examples is reduced more than that of Comparative Examples in all of the SCI reflection and SCE reflection.

In addition, G1 that represents a degree of decrease in the SCI reflectance in Examples including a low refractive body in the color conversion layer as compared with Comparative Examples is similar to G2 that represents a degree of decrease in the SCE reflectance. From these results, it may be seen that the reflection in the color conversion layer is caused mostly by the scatter reflection. Accordingly, the low refractive body included in the color conversion layer reduces a degree of scatter reflection, and the color conversion portion including the low refractive body is capable of reducing the reflectance of the liquid crystal display device caused by the external light.

The liquid crystal display device having a color conversion layer that includes a light emitter and a low refractive body can enhance color reproducibility and improve external light extraction efficiency. Further, the reflectance caused by external light is reduced and a contrast ratio and the like under a bright ambient condition is increased, so that the display quality of the liquid crystal display device may be improved.

According to one embodiment, the liquid crystal display device includes a low refractive body having a low refractive index value of about 1.3 or less in the color conversion layer and changes a path of light that is incident to the color conversion layer or light, or that is emitted from or scattered by the light emitter of the color conversion layer, so that the amount of light totally reflected into the display panel from the interface between the display panel and the outside may be reduced to improve light efficiency. In addition, the low refractive body may decrease a degree of light scattering to reduce the reflectance due to the external light in the color conversion layer.

One embodiment may provide a liquid crystal display device that includes a low refractive body in the color conversion layer to improve light extraction efficiency from the display panel to the outside.

One embodiment may provide a liquid crystal display device that includes a low refractive body in a color conversion layer including a quantum dot and the like, exhibits enhanced color reproducibility and has reduced external light reflectance.

Although the exemplary embodiments of the present disclosure have been described, it is understood that the present disclosure should not be limited to these exemplary embodiments, but various changes and modifications can be made by one ordinary skilled in the art within the spirit and scope of the present disclosure.

Therefore, the technical scope of the present disclosure should not be limited to the embodiments described in the detailed description of the specification but should be defined by the claims.

What is claimed is:

1. A liquid crystal display device, comprising:
a light source member and a display panel disposed on the light source member, wherein the display panel includes:
a first substrate;
a second substrate facing the first substrate and disposed closer to the light source member than the first substrate;
a liquid crystal layer disposed between the first substrate and the second substrate; and
a color conversion layer disposed between the liquid crystal layer and the first substrate,
wherein the color conversion layer includes a first color conversion portion, a second color conversion portion, and a third color conversion portion that are spaced apart from one another on a plane,
wherein each of the first to third color conversion portions including a base resin, a high refractive material that is dispersed in the base resin, and a low refractive body dispersed in the base resin,
wherein the first color conversion portion includes a first quantum dot that is dispersed in the base resin, and the first quantum dot is configured to absorb a first color light provided from the light source member and emit a second color light that is different from the first color light, wherein the second color conversion portion includes a second quantum dot that is dispersed in the base resin, and the second quantum dot is configured to absorb the first color light and emit a third color light that is different from the first color light and the second light color, wherein the third color conversion portion does not include a light emitter, and the third color conversion portion is configured to transmit the first color light, wherein the high refractive material is different from the first and second quantum dots, and the high refractive material comprises at least one of $TiO_2$, $TaO_2$, $ZrO_2$, $Fe_2O_3$, $Al_2O_3$, $ZnO$, $In_2O_3$, $SnO_2$, or $Sb_2O_3$, and wherein the high refractive material has a refractive index of 1.7 to 3.5, and the low refractive body has a refractive index of 1.0 to 1.3.

2. The liquid crystal display device of claim 1, wherein the low refractive body comprises at least one of hollow silica, aerogel, a porous inorganic particle including pores, and a porous organic particle including pores.

3. The liquid crystal display device of claim 1, wherein the display panel further comprises a light blocking layer disposed between the color conversion layer and the first substrate and blocking blue light.

4. The liquid crystal display device of claim 3, wherein the light blocking layer overlaps the first color conversion portion and the second color conversion portion and does not overlap the third color conversion portion.

5. The liquid crystal display device of claim 3, wherein the light blocking layer is a yellow color filter layer.

6. The liquid crystal display device of claim 1,
wherein the color conversion layer further comprises a light blocking portion disposed between the first color conversion portion, the second color conversion portion, and the third color conversion portion that are spaced apart from one another.

7. The liquid crystal display device of claim 1, wherein the light source member emits blue light, the first color conversion portion emits red light, and the second color conversion portion emits green light.

8. A liquid crystal display device, comprising:
a light source member and a display panel disposed on the light source member, wherein the display panel includes:
a first substrate;
a second substrate facing the first substrate and disposed closer to the light source member than the first substrate;
a liquid crystal layer disposed between the first substrate and the second substrate;
a polarizing layer disposed between the liquid crystal layer and the first substrate; and
a color conversion layer disposed between the liquid crystal layer and the first substrate and including a base resin, a high refractive material that is dispersed in the base resin, and a low refractive body that is dispersed in the base resin,
wherein the color conversion layer comprises:
a first color conversion portion including a first quantum dot, the high refractive material, and the low refractive body; and
a second color conversion portion including a second quantum dot, the high refractive material, and the low refractive body, wherein the high refractive material is different from the first and second quantum dots, and the high refractive material comprises at least one of $TiO_2$, $TaO_2$, $ZrO_2$, $Fe_2O_3$, $Al_2O_3$, $ZnO$, $In_2O_3$, $SnO_2$, or $Sb_2O_3$, and wherein the high refractive material has a refractive index of 1.7 to 3.5, and the low refractive body has a refractive index of 1.0 to 1.3.

9. The liquid crystal display device of claim 8, wherein the color conversion layer further comprises:
a third color conversion portion including the high refractive material and the low refractive body excluding a light emitter,
wherein the first quantum dot is configured to absorb a first color light provided from the light source member and emit a second color light that is different from the first color light, and
wherein the second quantum dot is configured to absorb the first color light and emit a third color light that is different from the first color light and the second color light.

10. The liquid crystal display device of claim 8, wherein the polarizing layer is disposed between the liquid crystal layer and the color conversion layer.

11. A liquid crystal display device, comprising:
a light source member configured to emit blue light; and
a display panel disposed on the light source member and including a red pixel area, a green pixel area, and a blue pixel area, wherein the display panel includes:
a first substrate;
a second display substrate facing the first substrate and disposed closer to the light source than the first substrate;
a liquid crystal layer disposed between the first substrate and the second substrate; and
a color conversion layer disposed between the liquid crystal layer and the first substrate, wherein the color conversion layer includes:
a first color conversion portion disposed corresponding to the red pixel area and including a first quantum dot that is configured to absorb the blue light and emit red light;
a second color conversion portion disposed corresponding to the green pixel area and including a second quantum dot that is configured to absorb the blue light and emit green light; and
a third color conversion portion disposed corresponding to the blue pixel area and configured to transmit the blue light, and the third color conversion portion does not include a light emitter,
wherein each of the first to third color conversion portions includes a base resin, a high refractive material that is dispersed in the base resin, and a low refractive body that is dispersed in the base resin,
wherein the high refractive material is different from the first and second quantum dots, and the high refractive material comprises at least one of $TiO_2$, $TaO_2$, $ZrO_2$, $Fe_2O_3$, $Al_2O_3$, $ZnO$, $In_2O_3$, $SnO_2$, or $Sb_2O_3$, and
wherein the high refractive material has a refractive index of 1.7 to 3.5, and the low refractive body has a refractive index of 1.0 to 1.3.

* * * * *